(12) United States Patent
Kallam et al.

(10) Patent No.: US 10,739,845 B2
(45) Date of Patent: Aug. 11, 2020

(54) APPARATUS FOR POWER CONSUMPTION REDUCTION IN ELECTRONIC CIRCUITRY AND ASSOCIATED METHODS

(71) Applicant: Silicon Laboratories Inc., Austin, TX (US)

(72) Inventors: Praveen Kallam, Austin, TX (US); Johnny Gudmund Bjornsen, Trondheim (NO); Kenneth W. Fernald, Austin, TX (US); Scott Willingham, Austin, TX (US); Pavel Konecny, Asker (NO)

(73) Assignee: Silicon Laboratories Inc., Austin, TX (US)

( * ) Notice: Subject to any disclaimer, the term of this patent is extended or adjusted under 35 U.S.C. 154(b) by 96 days.

(21) Appl. No.: 16/200,026

(22) Filed: Nov. 26, 2018

(65) Prior Publication Data

US 2019/0163257 A1 May 30, 2019

Related U.S. Application Data

(62) Division of application No. 14/794,779, filed on Jul. 8, 2015, now Pat. No. 10,139,896.

(51) Int. Cl.
*G06F 1/3296* (2019.01)
*G06F 11/32* (2006.01)

(52) U.S. Cl.
CPC .......... *G06F 1/3296* (2013.01); *G06F 11/325* (2013.01); *Y02D 10/172* (2018.01)

(58) Field of Classification Search
CPC .............................. G06F 11/325; G06F 1/3296
See application file for complete search history.

(56) References Cited

U.S. PATENT DOCUMENTS

| 10,139,896 B2 | 11/2018 | Kallam | |
| 2004/0257151 A1* | 12/2004 | Chan | G05F 3/24 327/540 |
| 2013/0007473 A1* | 1/2013 | van der Lee | H04B 5/0031 713/300 |

OTHER PUBLICATIONS

Office communication in U.S. Appl. No. 14/794,779 (U.S. Pat. No. 10,139,896) dated Jan. 17, 2017.
Office communication in U.S. Appl. No. 14/794,779 (U.S. Pat. No. 10,139,896) dated May 8, 2017.
Office communication in U.S. Appl. No. 14/794,779 (U.S. Pat. No. 10,139,896) dated Nov. 16, 2017.
Office communication in U.S. Appl. No. 14/794,779 (U.S. Pat. No. 10,139,896) dated Jul. 25, 2018.

\* cited by examiner

*Primary Examiner* — Terrell S Johnson
(74) *Attorney, Agent, or Firm* — Law Offices of Maximilian R. Peterson

(57) ABSTRACT

An apparatus includes a circuit that has a normal mode of operation and a low-power mode of operation. The circuit consumes more power in the normal mode of operation than in the low-power mode of operation. The apparatus further includes a power-supply circuit. The power-supply circuit provides a normal supply voltage to the circuit in the normal mode of operation. The power-supply circuit includes a non-linear circuit to provide a compressed supply voltage to the circuit in the low-power mode of operation, wherein the normal supply voltage is greater than the compressed supply voltage.

20 Claims, 6 Drawing Sheets

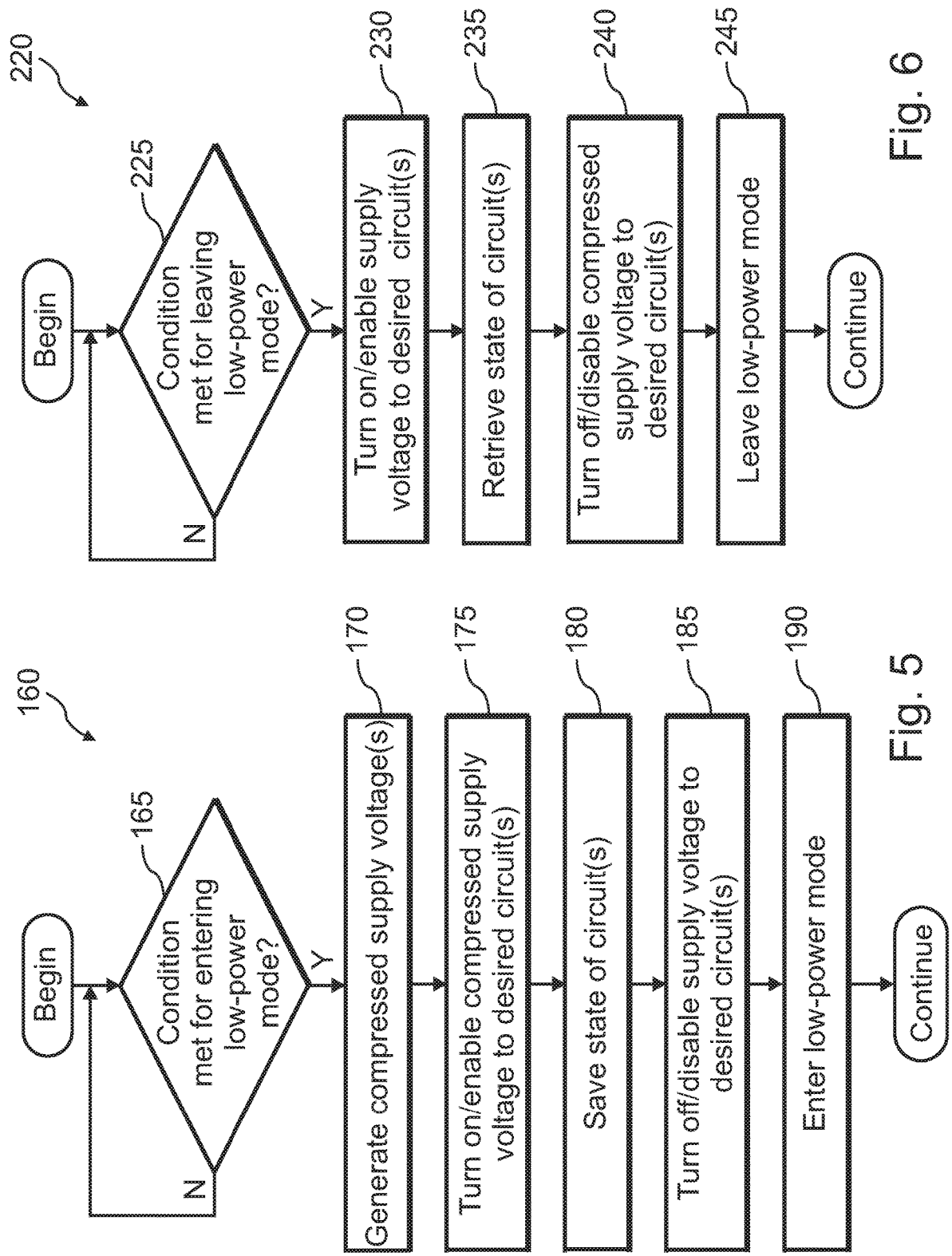

APPARATUS FOR POWER CONSUMPTION REDUCTION IN ELECTRONIC CIRCUITRY AND ASSOCIATED METHODS

CROSS-REFERENCE TO RELATED APPLICATIONS

This Application is a divisional of co-pending application Ser. No. 14/794,779, filed on Jul. 8, 2015, titled 'Apparatus for Power Consumption Reduction in Electronic Circuitry and Associated Methods,' which is hereby incorporated by reference in its entirety for all purposes.

TECHNICAL FIELD

The disclosure relates generally to reducing power consumption in electronic circuitry and, more particularly, to apparatus for reducing power consumption during a low-power or sleep mode of electronic apparatus, and associated methods.

BACKGROUND

With advances in technology, an increasing number of circuit elements have been integrated into devices, such as integrated circuits (ICs). Furthermore, a growing number of devices, such as ICs, or subsystems, have been integrated into products. With developments such as the Internet of Things (IoT), this trend is expected to continue.

The growing number of circuit elements, devices, subsystems, etc., has also resulted in a corresponding increase in the amount of power consumed in the products that include such components. In some applications, such as battery powered, mobile, or portable products, a limited amount of power or energy is available. Given the relatively small amount of power or energy available in such applications, reduced power consumption of the components or products provides advantages or benefits, for example, extending the battery life, increasing the "up-time" or active time of the system, and the like.

Even in non-portable environment, increased power consumption invariably results in larger amounts of generated heat, as the electrical energy is not used 100% efficiently. Thus, reduced power consumption of the components or products provides advantages or benefits, for example, reduced heat amounts, reduced cost of electricity, and the like.

The description in this section and any corresponding figure(s) are included as background information materials. The materials in this section should not be considered as an admission that such materials constitute prior art to the present patent application.

SUMMARY

A variety of apparatus and associated methods are contemplated for apparatus for reducing power consumption during a low-power or sleep mode of electronic apparatus. In an exemplary embodiment, an apparatus includes a circuit that has a normal mode of operation and a low-power mode of operation. The circuit consumes more power in the normal mode of operation than in the low-power mode of operation. The apparatus further includes a power-supply circuit. The power-supply circuit provides a normal supply voltage to the circuit in the normal mode of operation. The power-supply circuit includes a non-linear circuit to provide a compressed supply voltage to the circuit in the low-power mode of operation, wherein the normal supply voltage is greater than the compressed supply voltage.

In another exemplary embodiment, an apparatus includes two storage circuits. The first storage circuit stores information, and has a normal mode of operation, and a low-power mode of operation in which the first storage circuit consumes less power than in the normal mode of operation. The second storage circuit retains a state of the first storage circuit in the low-power mode of operation. The retained state is to be provided to the first storage circuit when the first storage circuit resumes the normal mode of operation. The apparatus further includes a power-supply circuit that provides a normal supply voltage to the first storage circuit in the normal mode of operation. The power-supply circuit includes a first non-linear circuit that provides a compressed supply voltage to the second storage circuit in the low-power mode of operation, such that the normal supply voltage is greater than the compressed supply voltage.

In another exemplary embodiment, a method includes operating a circuit in a normal mode of operation by providing a normal supply voltage to the circuit in the normal mode of operation. The method also includes operating the circuit in the low-power mode of operation by using a non-linear circuit to provide a compressed supply voltage to the circuit in the low-power mode of operation. The normal supply voltage is greater than the compressed supply voltage, such that the circuit consumes less power in the low-power mode of operation than in the normal mode of operation.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

FIG. 5 illustrates a flow diagram according to an exemplary embodiment of a method of switching from the normal mode of operation to the low-power mode of operation.

FIG. 6 depicts a flow diagram according to an exemplary embodiment of a method of switching from the low-power mode of operation to the normal mode of operation.

DETAILED DESCRIPTION

The disclosed concepts relate generally to reducing power consumption of electronic circuitry. More specifically, the disclosed concepts provide apparatus and methods for reducing power consumption during a low-power or sleep mode of electronic apparatus.

Apparatus according to exemplary embodiments include more than one mode of operation. Specifically, in one more of operation, the apparatus operates normally, e.g., it dissipates or consumes a nominal or "normal" amount of power. In another mode of operation, the apparatus operates in a low-power mode of operation. In this mode of operation, the apparatus consumes less power than it does in the normal mode of operation. This mode of operation may also be known as the sleep mode. Typically, in this mode of operation, some of the circuits in the apparatus are powered down or are placed in a low-power mode of operation, whereas other circuits are powered down or disabled (so that they consume no or virtually no power).

In some embodiments, during the low-power mode operation, some circuits in the apparatus stay powered or, put another way, operate normally. Thus, such circuits operate in the same manner as they do during the normal mode of operation of the apparatus.

As noted, the disclosed apparatus and techniques provide mechanisms for reducing the power consumption of electronic apparatus during the low-power or sleep mode of operation. Generally speaking, in exemplary embodiment, some of the circuits in the apparatus are powered from a compressed supply voltage or potential and/or a compressed ground or return voltage or potential. The compressed supply and/or ground voltages reduce the power consumption in circuits in the apparatus that are powered by them. As a result, the apparatus overall consumes less power than it would if compressed supply and/or ground voltages were not used.

Figure 1:
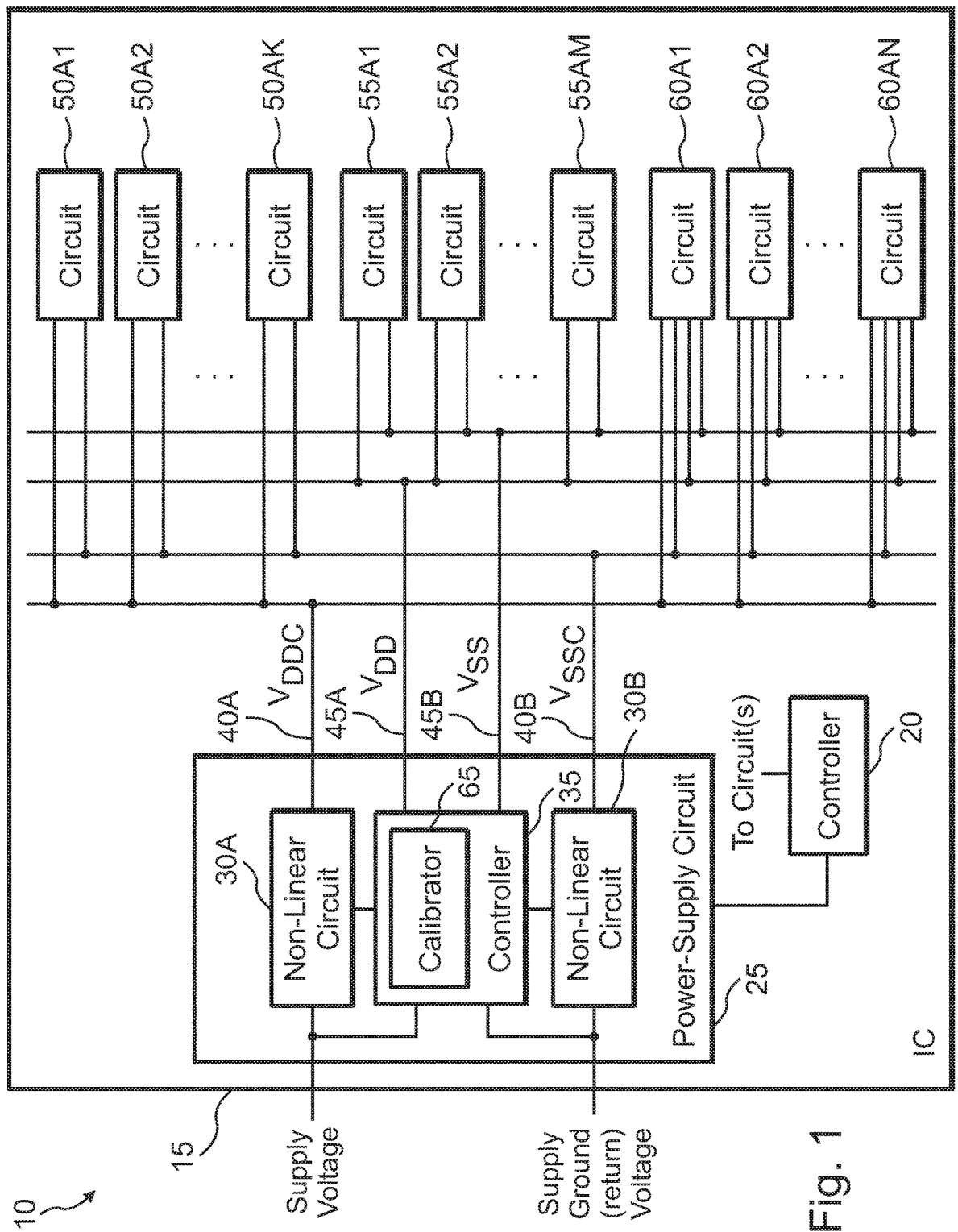
FIG. 1 illustrates a circuit arrangement for reducing power consumption of an electronic circuit, such as an IC, according to an exemplary embodiment.

FIG. 1 illustrates a circuit arrangement 10 for reducing power consumption of an electronic apparatus or circuit, such as an IC 15, according to an exemplary embodiment. In some embodiments, IC 15 resides within or is part of another apparatus, such as a circuit block, module, sub-system, system, and the like, as person of ordinary skill in the art will understand.

Referring to the general circuit arrangement in FIG. 1, apparatus 15 includes a power-supply circuit 25. Power-supply circuit 25 operates under the control of controller 20. Controller 20 controls various operations of power-supply circuit 25, such as during the low-power and normal modes of operation of apparatus 15, as described below in detail.

As shown in the exemplary embodiment of FIG. 1, power-supply circuit 25 receives a supply voltage and a supply ground (or return) voltage. Using the supply voltage and the supply ground voltage, power-supply circuit 25 provides four supply voltages and ground voltages, i.e., $V_{DD}$ (an uncompressed or "normal" supply voltage, labeled as 45A), $V_{SS}$ (an uncompressed or "normal" ground voltage, labeled as 45B), $V_{DDC}$ (a compressed supply voltage, labeled as 40A), and $V_{SSC}$ (a compressed ground voltage, labeled as 40B).

The voltages $V_{DD}$, $V_{SS}$, $V_{DDC}$, and $V_{SSC}$ are used to provide power to various circuits in apparatus 15, such as circuits 50A1-50AK (K circuits), 55A1-55AM (M circuits), and 60A1-60N (N circuits), where K, M, and N denote positive integers. More specifically, supply voltage $V_{DD}$ and ground voltage $V_{SS}$ provide power to circuitry in apparatus 15, typically during the normal mode of operation. In the example shown, circuits 55A1-55AM receive power from $V_{DD}$ and $V_{SS}$. Furthermore, supply voltage $V_{DDC}$ and ground voltage $V_{SSC}$ provide power to circuitry in apparatus 15, typically during the low-power mode of operation. In the example shown in FIG. 1, circuits 55A1-55AM receive power from $V_{DDC}$ and $V_{SSC}$.

Some circuits in apparatus 15 may receive power from both the normal and compressed supply and ground voltages, i.e., $V_{DD}$, $V_{SS}$, $V_{DDC}$, and $V_{SSC}$. In the example shown, circuits 60A1-60AN receive power via $V_{DD}$, $V_{SS}$, $V_{DDC}$, and $V_{SSC}$. A variety of schemes are contemplated as regards supplying power to circuits 60A1-60AN. For example, in some embodiments, circuits 60A1-60AN may receive power from $V_{DD}$ and $V_{SS}$ during the normal mode of operation of apparatus 15, but receive power from $V_{DDC}$ and $V_{SSC}$ during the low-power mode of operation of apparatus 15.

In some embodiment, one or more of circuits 60A1-60AN, or one or more parts of circuits 60A1-60AN, may receive power from $V_{DD}$, $V_{SS}$, $V_{DDC}$, and $V_{SSC}$ during both the normal and low-power mode of operation of apparatus 15. In some embodiments, one or more parts of one or more of circuits 60A1-60AN may receive power via $V_{DD}$ and $V_{SS}$ during the normal mode of operation, and via $V_{DDC}$ and $V_{SSC}$ during the low-power mode of operation of apparatus 15.

Generally speaking, the choice of supply and ground voltages for various circuitry in apparatus 15 depends on factors such as desired performance, power-consumption level(s), design and performance considerations and specifications, as desired. In general, for each circuit or block in apparatus 15, a tradeoff exists between performance levels (e.g., operating speed) and power consumption (e.g., power dissipated because of leakage), as person of ordinary skill in the art will understand. The supply and ground voltages may be selected using this tradeoff, as desired.

Referring to the embodiment shown in FIG. 1, power-supply circuit includes controller 35, which controls non-linear circuit 30A and non-linear circuit 30B. Under the control of controller 35, non-linear circuit 30A generates the compressed supply voltage $V_{DDC}$. Similarly, under the control of controller 35, non-linear circuit 30B generates the compressed ground voltage $V_{SSC}$. Non-linear circuits 30A-30B may be realized or implemented in a variety of ways, such as diodes, transistors, etc., as desired, and as described below in detail.

Referring to FIG. 1, a variety of control schemes are contemplated, depending on factors such as available technology, design and performance criteria and specifications, and the like. For example, in some embodiments, controller 35 may be included in controller 20. As another example, in some embodiments, controller 20 may be included in controller 35. In some embodiments, such as the exemplary embodiment in FIG. 1, power-supply circuit 25 may include calibrator 65. Calibrator 65 allows calibration and/or adjustment (or setting or programming or modifying) of the levels of compressed supply voltage $V_{DDC}$ and/or compressed ground voltage $V_{SSC}$, as desired.

Values or constants corresponding to the desired calibrated voltage levels may be saved or stored, as desired. For example, in some embodiments, the calibration values may be stored in a non-volatile memory, such as flash memory for later retrieval and use, for example, the next time apparatus 15 powers up or resets. As another example, in some embodiments, the calibration values may be set by a user of apparatus 15 (e.g., via a configuration register of apparatus 15) or by another circuit (for example, by a system or a sub-system in a system, etc.).

As another example, in some embodiments, the calibration values may be modified (or set or programmed or adjusted) depending on operating conditions of apparatus 15. Examples of operating conditions of apparatus 15 include supply voltage ($V_{DD}$), ground voltage ($V_{SS}$), temperature, desired performance (e.g., operating speed of one or more circuits in apparatus 15), a change in desired performance, and the like, as person of ordinary skill in the art will understand.

The calibration values may be modified according to a desired timetable, such as in real-time, at prescribed periods or points in time, upon the occurrence of one or more conditions or criteria (e.g., a supply voltage exceeding or falling below a threshold value), and the like. The choice of modification of calibration values depends on factors such as available technology, and design and performance considerations and specifications, as person of ordinary skill in the art will understand.

Note that either or both of the normal and low-power modes of operation may include provisions for gradations in the amount of power consumed by various circuits. For example, in some embodiments, during the normal mode of operation, some circuits may be powered from a higher supply voltage than other circuits in apparatus 15, for instance, when higher performance or operating speed is desired. As another example, in some embodiments, during the low-power mode of operation, some circuits may be powered from a lower supply voltage than other circuits in apparatus 15, for example, when lower performance or operating speed is acceptable. Those and other scenarios may be accommodated by making appropriate modifications to power-supply circuit 25 (including controller 35) and/or controller 25, as person of ordinary skill in the art will understand.

Generally speaking, compressed supply voltage $V_{DDC}$ and compressed ground voltage $V_{SSC}$ are chosen in relation to the supply voltage $V_{DD}$ and ground voltage $V_{SS}$ to achieve a tradeoff between performance levels and power consumption of various circuits in apparatus 15. During the low-power mode of operation, some circuits in apparatus 15 may be powered down or placed in a low-power state. Such circuits therefore would normally not operate with a relatively high level of performance (as compared to the normal mode of operation). By using compressed supply and compressed ground voltages that have values, respectively, less than the normal supply voltage and greater than the normal ground voltage, power consumption of circuits powered via the compressed supply and compressed ground voltages may be reduced.

Figure 2:
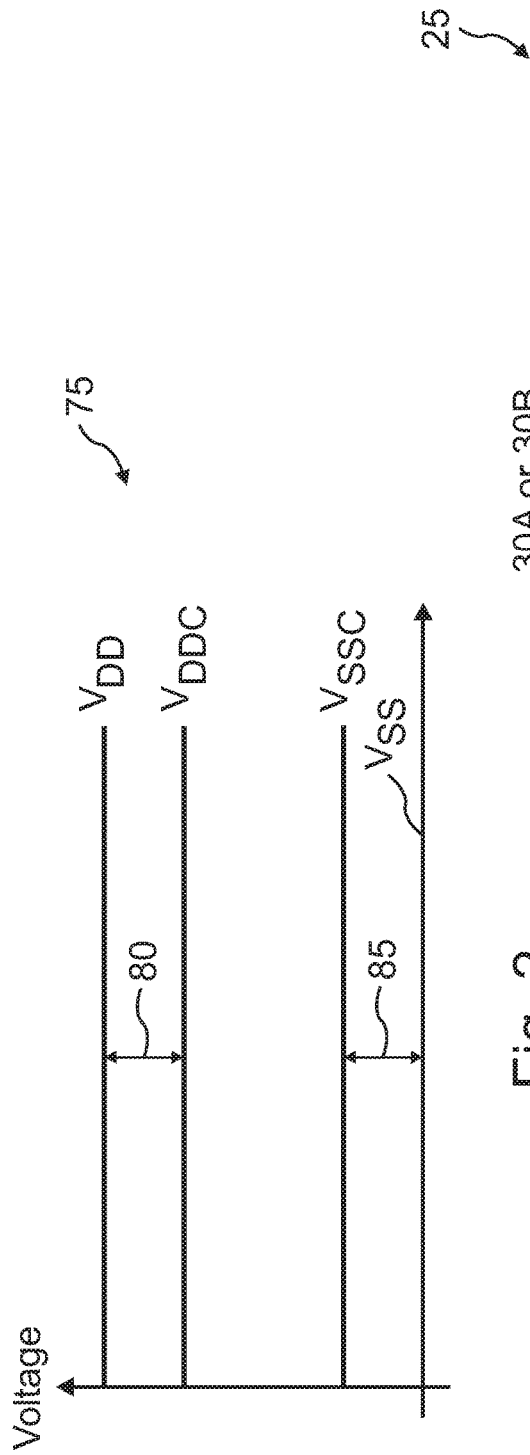
FIG. 2 depicts relative levels of the normal supply, normal ground, compressed supply, and compressed ground voltages according to an exemplary embodiment.

FIG. 2 depicts a graph 75 of the relative levels of the normal supply, normal ground, compressed supply, and compressed ground voltages according to an exemplary embodiment. In the example shown, $V_{DD}$ is larger than $V_{DDC}$ by a voltage differential 80. Conversely, as FIG. 2 illustrates, $V_{SS}$ is smaller than $V_{SSC}$ by a voltage differential 85. Thus, a circuit powered by $V_{DDC}$ and $V_{SSC}$ would consume less power than it would if powered by $V_{DD}$ and $V_{SS}$.

In exemplary embodiments, the relative levels of $V_{DD}$ and $V_{DDC}$ and/or the relative levels of $V_{SS}$ and $V_{SSC}$ may be fixed, e.g., by a voltage differential or one voltage having a value that is a fraction of the other voltage. For example, $V_{DDC}$ may have 90% of the value of $V_{DD}$, i.e., $V_{DDC}=0.9\times V_{DD}$. As another example, $V_{SSC}$ and $V_{SS}$ may differ by, say, 0.3 V, i.e., $V_{SSC}-V_{SS}=0.3$ V).

In other embodiments, the relative levels of $V_{DD}$ and $V_{DDC}$ and/or the relative levels of $V_{SS}$ and $V_{SSC}$ may be variable, as person of ordinary skill in the art will understand. Thus, the relative levels of the various normal and compressed supply and ground voltages may change as a function of time, as a function of the operating conditions or environment of apparatus 15, and the like, as noted above.

Furthermore, depending on the desired level of power consumption reduction (and/or desired performance level of various circuits), normal supply and/or ground voltages may be combined with compressed supply and/or ground voltages to power one or more circuits in apparatus 15. For example, one or more circuits in apparatus 15 may be powered by $V_{DD}$ and $V_{SSC}$. As another example, one or more circuits in apparatus 15 may be powered by $V_{DDC}$ and $V_{SS}$.

One aspect of the disclosure concerns providing a body bias to one or more transistors, groups of transistors, circuits, or blocks of circuits, in apparatus 15 in order to reduce the overall power consumption of apparatus 15. This technique may be used in combination with compressed supply and/or compressed ground voltages to further reduce power consumption of one or more circuits in apparatus 15 and, thus, of apparatus 15.

In some embodiments, circuits in apparatus 15 use metal oxide semiconductor (MOS) transistors. Changing the body-bias level of a MOS transistor affects its various performance characteristics, such as leakage level (hence, power consumption), threshold voltage, operating speed, and the like. More specifically, the drain current of the MOS transistor in the saturation region of operation depends on the threshold voltage and the gate-to-source voltage of the transistor, that is, $$i_D = K(v_{GS} - V_T)^2,$$

where $i_D$ constitutes the total drain current (i.e., including AC and DC components), K represents a constant, $v_{GS}$ constitutes the total gate-to-source voltage (i.e., including AC and DC components), and $V_T$ denotes the threshold voltage.

The threshold voltage, $V_T$, in turn depends on a number of factors, such as the voltage between the source and body regions of the MOS transistor. Stated mathematically, $$V_T = V_{T(0)} + \gamma\{\sqrt{2\phi_F - v_{BS}} - \sqrt{2\phi_F}\},$$

or, alternatively, in terms of the source-to-body voltage, $v_{SB}$:

$$V_T = V_{T(0)} + \gamma\{\sqrt{2\phi_F - v_{SB}} - \sqrt{2\phi_F}\},$$

In the above equations, $V_{T(o)}$ represents the threshold voltage when the source-to-body voltage (or body-to-source voltage) is set to zero, $\gamma$ represents the body factor (a constant that depends on the doping levels of the body of the MOS transistor), $\phi_F$ denotes a constant, $v_{BS}$ represents the total body-to-source voltage (i.e., including AC and DC components), and $v_{SB}$ denotes the total source-to-body voltage (i.e., including AC and DC components). As noted above, and as the above equations show, when the body-to-source voltage, $v_{BS}$, equals zero, the threshold voltage, $V_T$, equals $V_{T(o)}$.

Furthermore, note from the above equations that, for a finite, non-zero body factor, $\gamma$, the threshold voltage increases as the source-to-body voltage, $v_{SB}$, increases. An increase in the threshold voltage, $V_T$, decreases the drain current, $i_D$ (assuming a given value of $v_{GS}$). Hence, given a constant gate-to-source-voltage, $v_{GS}$, increasing the source-to-body voltage, $v_{SB}$, causes the threshold voltage, $V_T$ to increase.

The power dissipation of the transistor varies according to changes in its threshold voltage. For example, the transistor leakage current varies as a function of the threshold voltage. More specifically, a smaller threshold voltage increases the OFF-state leakage current ($I_{off}$) of the transistor, and vice-versa. The $I_{off}$ of the transistor affects its static (non-switching) power dissipation. Thus, changing the threshold voltage by adjusting the body bias affects the power dissipation of the MOS transistor. For example, an increased body-bias (increased source-to-body voltage, $v_{SB}$) results in a larger threshold voltage, and a smaller power consumption of the transistor.

An increased threshold voltage also causes a decrease in the quantity ($v_{GS}-V_T$) and, consequently, a decrease in the drain current, $i_D$, of the transistor. For a constant gate-to-source-voltage, $v_{is}$, an increase in the source-to-body voltage, $v_{SB}$, causes a decrease in the current-drive capability (one measure of performance) of the transistor. Thus, by adjusting the body-bias voltage of one or more transistors in apparatus 15, a tradeoff may be made between the power consumption of the transistor and its drive capability, operating speed, etc.

As noted above, low-power or sleep mode of operation, however, typically does not call for high performance operation (e.g., high operating speed) of transistors. Increasing the threshold voltage would reduce the power dissipation of the transistor (and therefore of the overall IC or device), without adversely affecting the normal operation of the transistor (and thus of the overall IC or device).

Thus, in exemplary embodiments, the body bias of one or more transistors, groups of transistors (e.g., in one or more circuits, or blocks of circuits, in apparatus 15) may be increased in order to reduce the overall power consumption of apparatus 15. In some embodiments, the body of one or more transistors may be coupled to $V_{DD}$ during the low-power mode of operation in order to reduce leakage and, thus, power consumption of apparatus 15. During the normal mode of operation, the body of the transistor(s) may be coupled to $V_{DDC}$ to improve some operating characteristics of the transistor(s), such as increased operating speed. This technique (adjusting the body bias of transistor(s)) may be combined with the use of compressed supply and ground voltages to further reduce the power consumption of apparatus 15 (or to effect a tradeoff between power consumption and performance of transistor(s) in one or more circuits, or blocks of circuits, in apparatus 15).

Figure 3:
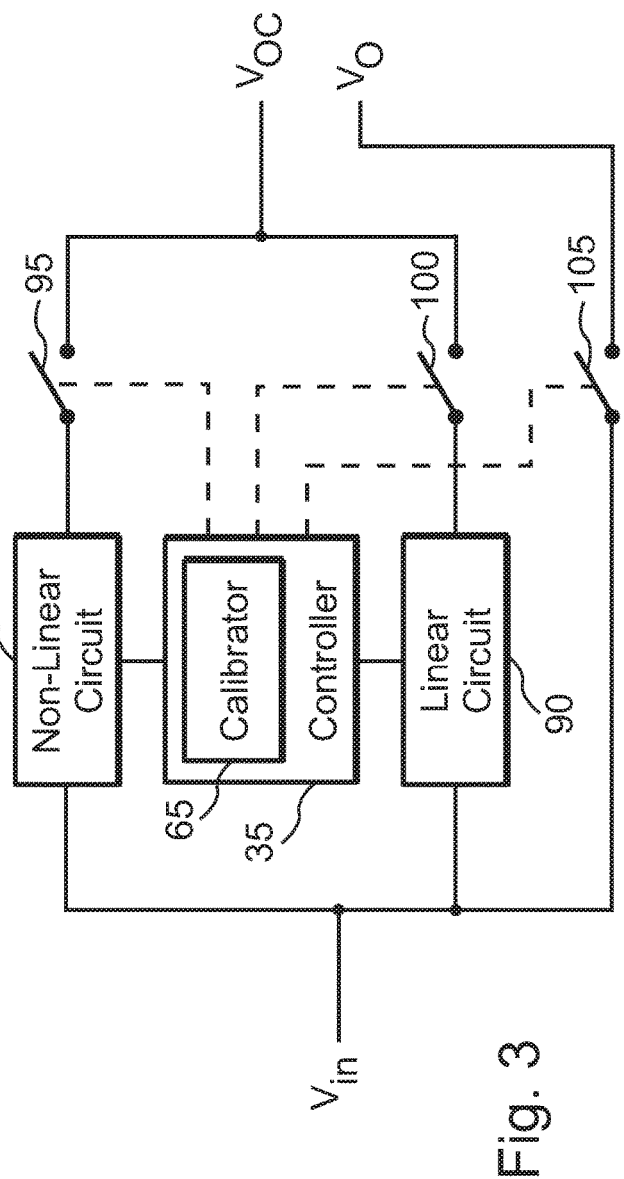
FIG. 3 shows a block diagram of a power-supply circuit according to an exemplary embodiment.

Another aspect of the disclosure relates to use of non-linear and linear circuits in power-supply circuit 25. FIG. 3 shows a block diagram of power-supply circuit 25 according to an exemplary embodiment. Power-supply circuit 25 includes non-linear circuit 30A (or 30B), controller 35 (including, if desired, calibrator 65), and linear circuit 90. As noted above, under the control of controller 35, power-supply circuit 25 uses non-linear circuit 30A or 30B to generate compressed supply voltage $V_{DDC}$ (if using non-linear circuit 30A) and/or compressed ground voltage $V_{SSC}$ (if using non-linear circuit 30B), respectively. Use of non-linear circuit 30A (or 30B) allows generating a compressed voltage ($V_{DDC}$ and $V_{SSC}$, respectively) that varies non-linearly as a function of a control voltage (as supplied, for example, by controller 35).

Non-linear circuit 30A (or 30B) receives an input voltage ($V_{in}$), e.g., supply voltage $V_{DD}$ or ground voltage $V_{SS}$), and generates a compressed voltage, which it provides as a compressed output voltage, $V_{oc}$, of power-supply circuit 25 via switch 95.

Using non-linear circuits 30A and/or 30B provides a number of advantageous attributes. For instance, as leakage increases as a function of temperature, the non-linear transfer function of non-linear circuits 30A and/or 30B, i.e., the non-linear relationship between currents flowing through those circuits and the voltages across them limits the compression of the supply and/or ground voltages (i.e., voltage differentials 80 and 85 in FIG. 2). This attribute prevents the compression of the supply and/or ground voltages from becoming too extreme at relatively high temperatures as device leakage increases.

In some embodiments, diodes may be used as non-linear circuits 30A and/or 30B, which obviate using additional static currents to generate the compressed supply and/or ground voltages. In some embodiments, MOS devices, e.g., transistors with the gate coupled to the drain, may be used as non-linear circuits 30A and/or 30B. In some embodiments, a generated low-impedance voltage source between the compressed supply and/or ground voltages and the corresponding uncompressed supply and/or ground voltages.

In some embodiments, such as the embodiment shown in FIG. 3, a linear circuit 90 may be used. Linear circuit 90 may be used for a variety of reasons, such as when temperature swings in the operating environment of apparatus 15 are limited or relatively small, or to provide finer granularity over the output compressed voltage ($V_{oc}$) of power-supply circuit 25.

Referring to FIG. 3, linear circuit 90 receives the input voltage, $V_{in}$, of power-supply 25. Linear circuit 90 generates a compressed voltage, which it provides to the node labeled $V_{oc}$ via switch 100. Use of linear circuit 90 allows generating a compressed voltage (supply and/or ground voltage (s)) that varies linearly or nearly linearly as a function of a control voltage (as supplied, for example, by controller 35).

In exemplary embodiments, linear circuit 90 may be realized in a number of ways, as desired. In some embodiments, linear circuit 90 may constitute a resistor or variable resistor. In some embodiments, linear circuit 90 may constitute a current source (which can provide a minimum compressed supply or ground differential under extreme operating conditions, such as extreme or relatively high operating temperatures) of apparatus 15.

The output voltage of linear circuit 90 may be provided as the output voltage of power-supply voltage circuit 25, and may be combined with the output voltage of non-linear circuit 30A and/or 30B, as desired. More specifically, if switch 95 is closed and switch 100 is opened, non-linear circuit 30A (or 30B) provides the compressed output voltage, $V_{oc}$, of power-supply circuit 25. Conversely, if switch 95 is opened and switch 95 is opened, linear circuit 90 provides the compressed output voltage, $V_{oc}$, of power-supply circuit 25.

If both switch 95 and switch 100 are closed, then the compressed output voltage of non-linear circuit 30A (or 30B) and the compressed output voltage of linear circuit 90 are added to form the compressed output voltage, $V_{oc}$, of power-supply circuit 25. For added flexibility, switch 105 may optionally be used. By using switch 105, the input voltage, $V_{in}$, may be provided as an uncompressed output voltage, $V_o$, in a switchable manner.

In exemplary embodiments, switches 95, 100, and 105 (if used) may be implemented in a number of ways, as desired. The choice of implementation depends on factors such as available technology or semiconductor fabrication capabilities, design and performance considerations or specifications, etc., as person of ordinary skill in the art will understand. Generally, the switches are implemented so as to have relatively low-impedances (e.g., low ON-state resistance), for example, by using MOS transistors. Note that, as an alternative to the circuit arrangement shown, switches coupled in parallel to non-linear circuit 30A/30B and linear circuit 90 may be used to effective short those circuits and, thus, provide an uncompressed output voltage (i.e., $V_{oc}=V_{in}$), as desired.

Figure 4:
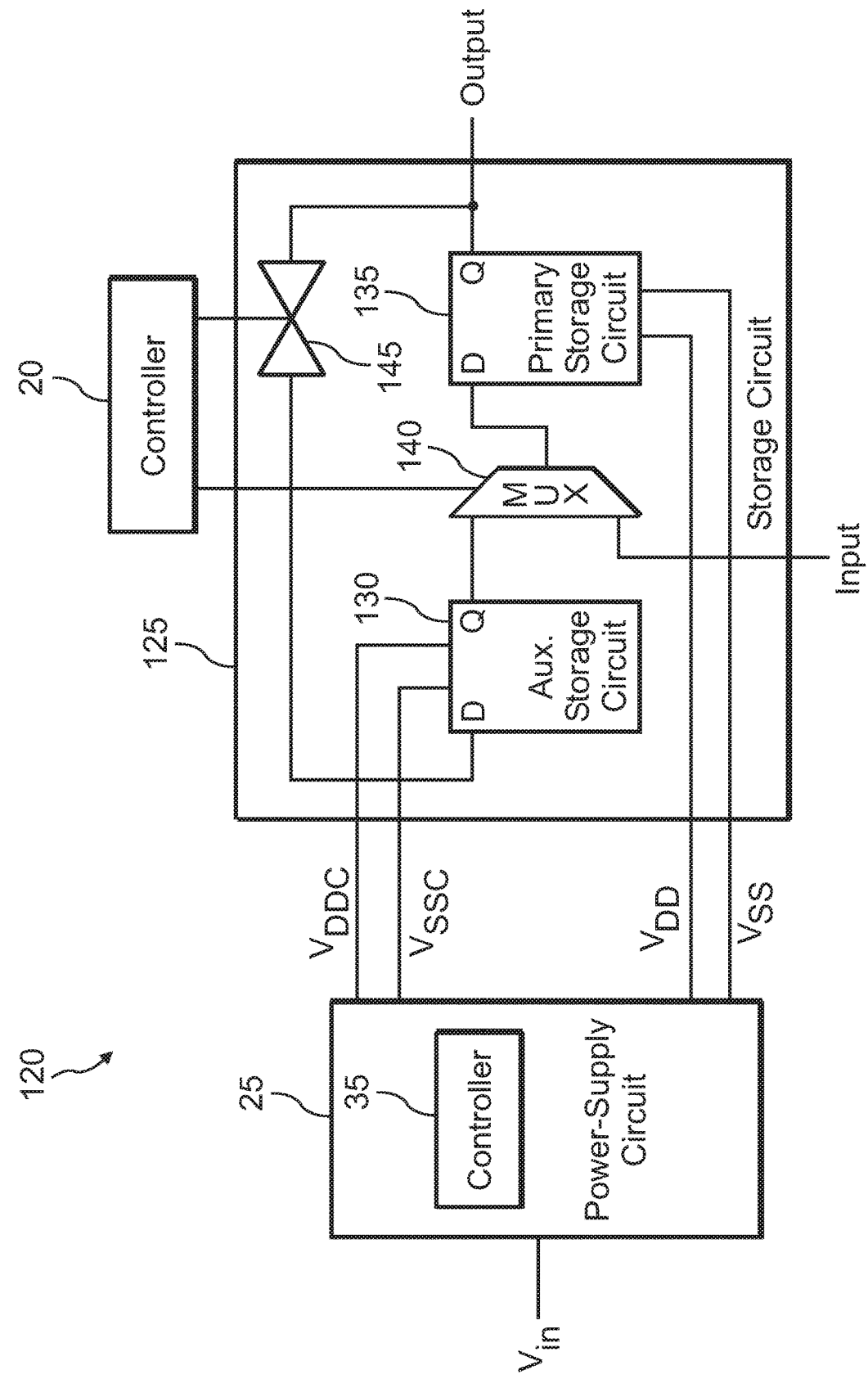
FIG. 4 depicts a circuit arrangement according to an exemplary embodiment for retaining the state of a storage circuit during the low-power mode of operation.

One aspect of the disclosure relates to using compressed supply and/or ground voltages to retain the state of storage circuits in apparatus 15 during the low-power mode of operation. FIG. 4 depicts a circuit arrangement 120 according to an exemplary embodiment for retaining the state of a storage circuit 125 (which resides in apparatus 15) during the low-power mode of operation of apparatus 15.

Specifically, storage circuit 125, e.g., a latch, includes two storage circuits, primary storage circuit 135 and auxiliary storage circuit 130. Primary storage circuit 135 provides better performance (e.g., higher speed of operation, lower setup and/hold times, etc.) compared to auxiliary storage circuit 130. Primary storage circuit 135 is powered by $V_{DD}$ and $V_{SS}$, as provided by power-supply circuit 25. Conversely, auxiliary storage circuit 130 is powered by $V_{DDC}$ and $V_{SSC}$, which it receives from power-supply circuit 25. In some embodiments, primary storage circuit 135 constitutes a flip-flop, and auxiliary storage circuit 130 constitutes a latch.

Primary storage circuit 135 is used during the normal mode of operation, whereas auxiliary storage circuit 130 is used during the low-power mode of operation of apparatus 15. More specifically, during the normal mode of operation, controller 20 causes multiplexer (MUX) to provide the signal present at the input of storage circuit 125 to drive the data (D) input of primary storage circuit 135. The output (Q) of primary storage circuit 135 drives the output of storage circuit 125. In this mode of operation, controller 20 disables transmission gate 145, i.e., the output signal of primary storage circuit 135 is not transmitted to the input (D) of auxiliary storage circuit 130. Furthermore, during the normal mode of operation, auxiliary storage circuit 130 may be powered down or disabled. For example, controller 20 may cause power-supply circuit 25 to provide no supply and/or ground voltage to auxiliary storage circuit 130.

When making a transition from the normal mode of operation to the low-power mode of operation, controller 20 powers up or enables auxiliary storage circuit 130 (e.g., by causing power-supply circuit 25 to provide voltages $V_{DDC}$ and/or $V_{SSC}$ to auxiliary storage circuit 130). As a result, auxiliary storage circuit 130 will be ready to store an input signal.

Controller 20 also causes transmission gate 145 to provide the output signal of primary storage circuit 135 to the input of auxiliary storage circuit 130. Controller 20 also causes auxiliary storage circuit 130 to sample (e.g., latch) the input signal of auxiliary storage circuit 130 (i.e., the output signal of primary storage circuit 135, as transmitted via transmission gate 145). Thereafter, controller 20 disables or powers down primary storage circuit 135 (e.g., controller 20 may cause power-supply circuit 25 to provide no supply and/or ground voltage to primary storage circuit 135). Thus, during the low-power mode of operation, auxiliary storage circuit 130, which consumes less power than primary storage circuit 135, retains the output signal or state of storage circuit 125.

When making a transition from the low-power mode of operation to the normal mode of operation, controller 20 powers up or enables primary storage circuit 135 (e.g., by causing power-supply circuit 25 to provide voltages $V_{DD}$ and/or $V_{SS}$ to primary storage circuit 135). As a result, primary storage circuit 135 130 will be ready to store an input signal.

Controller 20 also causes MUX 140 to provide the output signal of auxiliary storage circuit 130 to the input of primary storage circuit 135. Controller 20 also causes primary storage circuit 135 to sample (e.g., latch) the output signal of auxiliary storage circuit 130 (i.e., the output signal of auxiliary storage circuit 130, as transmitted via MUX 140). Thereafter, controller 20 disables or powers down auxiliary storage circuit 130 (e.g., controller 20 may cause power-supply circuit 25 to provide no supply and/or ground voltage to auxiliary storage circuit 130). Thus, during the normal mode of operation, primary storage circuit 135, which provides higher performance operation than auxiliary storage circuit 130, retains the output signal or state of storage circuit 125.

Note that the circuit arrangement shown in FIG. 4 constitutes merely an example of how one may implement conceptually the idea of using primary and auxiliary storage circuits to lower power consumption during the low-power mode of operation. Other circuit arrangement are contemplated and may be used, as person of ordinary skill in the art will understand. As another alternative, in some embodiments, auxiliary storage circuit 130, MUX 140, and transmission gate 145 may be omitted. Instead, primary storage circuit 135 may be powered by $V_{DDC}$ and/or $V_{SSC}$ during the low-power mode of operation, and by $V_{DD}$ and/or $V_{SS}$ during the normal mode of operation, respectively.

One aspect of the disclosure relates to methods or processes of switching between the normal and low-power modes of operation. FIG. 5 illustrates a flow diagram 160 according to an exemplary embodiment of a method of switching from the normal mode of operation to the low-power mode of operation. At 165, a check is made to determine whether a condition has been met (e.g., loss of power, low battery voltage/power, an interrupt, user command to enter sleep or low-power mode, etc.) for leaving the normal mode of operation and entering the low-power mode of operation. If so, at 170, compressed supply and/or ground voltages are generated, e.g., by using controller 20 and/or controller 35 to cause power-supply circuit 25 to generate $V_{DDC}$ and/or $V_{SSC}$.

Referring to FIG. 5, at 175 the compressed supply and/or ground voltages ($V_{DDC}$ and/or $V_{SSC}$) are provided (or turned on or enabled) to one or more circuits in apparatus 15, e.g., auxiliary storage circuit 130 in FIG. 4. Referring again to FIG. 5, at 180, the state of one or more circuits is saved, for example, the state of primary storage circuit 135, as described above. At 185, power supply and/or ground voltages ($V_{DD}$ and/or $V_{SS}$) to a desired set of circuits (e.g., primary storage circuit 135 in FIG. 4) are turned off or disabled. At 190, apparatus 15 (e.g., some or all of the circuits in apparatus 15) enter the low-power mode of operation.

FIG. 6 depicts a flow diagram 220 according to an exemplary embodiment of a method of switching from the low-power mode of operation to the normal mode of operation. At 225, a check is made to determine whether a condition has been met (e.g., return of power, adequate battery voltage/power, an interrupt, user command to resume to the normal mode of operation from the sleep or low-power mode, etc.) for leaving the low-power mode of operation and entering the normal mode of operation. If so, at 230, the supply of power to desired circuits (primary storage circuit 135) is turned on or enabled.

At 240, the compressed supply and/or ground voltages to one or more circuits (e.g., auxiliary storage circuit 130 or, generally, a circuit powered by $V_{DDC}$ and/or $V_{SSC}$ during the low-power mode of operation) is turned off or disabled. At 245, the low-power mode is left (i.e., apparatus 15 exits the low-power mode of operation), and the normal mode of operation resumes.

Figure 7:
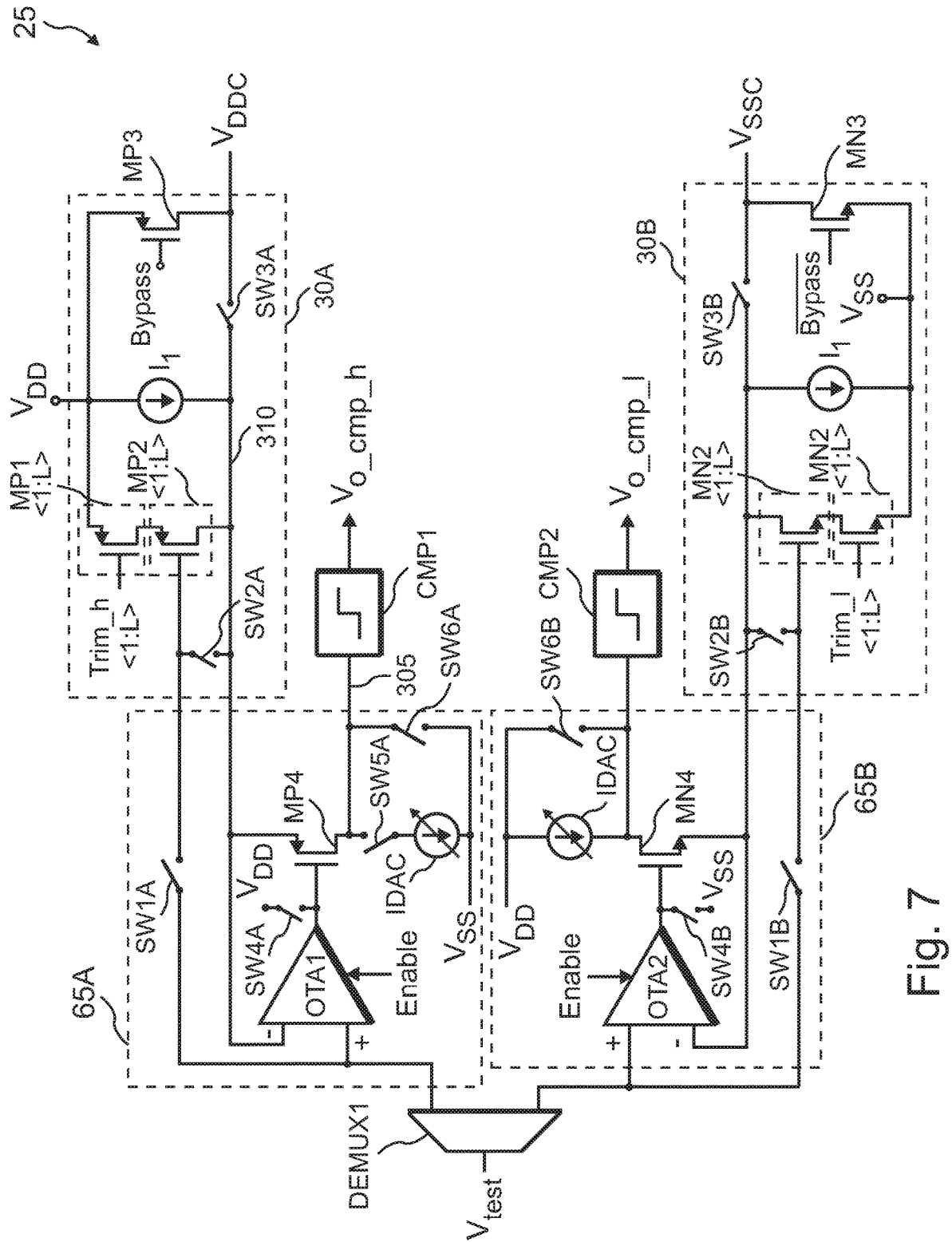
FIG. 7 illustrates a block diagram of a power-supply circuit according to an exemplary embodiment.

As noted above, in some embodiments, a calibration circuitry may be used to calibrate the compressed supply and/or ground voltages. FIG. 7 illustrates a partial block diagram or circuit arrangement of power-supply circuit 25, which includes this feature, according to an exemplary embodiment. In the embodiment shown, power-supply circuit 25 includes non-linear circuit 30A, which supplies $V_{DDC}$, and corresponding calibrator 65A. Similarly, power-supply circuit 25 includes non-linear circuit 30B, which supplies $V_{SSC}$, and corresponding calibrator 65B. The following description provides details of operation of non-linear circuit 30A and corresponding calibrator 65A. Non-linear circuit 30B and corresponding calibrator 65B operate in a similar manner (except that they use complementary devices, e.g., n-channel transistor MN3 instead of p-channel transistor MP3 (used in non-linear circuit 30A), uses switch SW1B instead of SW1A (used in non-linear circuit 30A), operating from $V_{SS}$ instead of $V_{DD}$, etc.), as person of ordinary skill in the art will understand.

Non-linear circuit 30A includes a plurality of L MOSFETs, labeled as MP2 <1:L>, where L represents a positive integer. Thus, MP2 may be considered a compound transistor, i.e., a set of transistors represented symbolically as transistor MP2 in FIG. 7 to facilitate presentation of the concepts. Switch SW2A allows coupling the drain and gate of MP2, i.e., making MP2 a non-linear device (diode-connected). One or more of the individual MOSFETs in MP2 may be used as a non-linear device by coupling its gate to its drain. Generally, the MOSFETs in MP2 have varying characteristics, such as size or drive strengths (e.g., width-to-length (W/L) ratios), and/or different types of transistor (e.g., high-voltage, low-voltage, etc.). Thus, using the various MOSFETs in MP2 will provide a non-linear device with different characteristics, which in turn gives rise to a different voltage differential between the compressed and uncompressed supply voltages, i.e., $V_{DD}$–$V_{DDC}$ (or compressed and uncompressed ground voltages in the case of non-linear circuit 30B).

Transistor MP1 includes a plurality of L MOSFETS, each coupled to a respective MOSFET in MP2. Thus, MP1 may be considered a compound transistor, i.e., a set of transistors represented symbolically as transistor MP1 in FIG. 7 to facilitate presentation of the concepts. The MOSFETs in MP1 act as switches that allow coupling the corresponding MOSFET in MP2 into the circuit so that it acts as a non-linear device. Thus, by turning on a given MOSFET in MP1, say, MP1A, the corresponding MOSFET in MP2, MP2A in this example, is coupled into the circuit, i.e., it is coupled to switch SW1A, switch SW2A, switch SW3A, and the inverting input of OTA1.

Given a desired or target voltage differential between $V_{DD}$ and $V_{DDC}$, one may then apply gate voltages to the MOSFETs in MP2 to determine which of the MOSFETs provides the target voltage differential when conducting a desired or prescribed current (i.e., the current that would be drawn from the compressed supply, $V_{DDC}$). Once the MOSFET in MP2 that meets that condition is identified, its gate may be coupled to its drain in order for it to act as a non-linear device, and generate the desired level of $V_{DDC}$. To identify that MOSFET, switch SW2A is opened, thus uncoupling the gate and drain of MP2 through switch SW2A. Switch SW3A is opened, thus uncoupling any circuits powered by $V_{DDC}$ from non-linear circuit 30A during calibration. Also, switch SW1A is closed, which forms a negative feedback loop that includes transistor MP4, and operational transconductance amplifier (OTA) OTA1 (or generally a transconductance stage).

More specifically, in response to a voltage applied to its gate, each MOSFET in MP2 conducts a certain amount of current that depends on its characteristics, e.g., width-to-length ratio (W/L). A voltage $V_{test}$ is applied selectively to the non-inverting input of OTA1 through demultiplexer (DEMUX) DEMUX1. Under the control of controller 35 (not shown) and/or controller 20 (not shown), DEMUX1 provides the voltage $V_{test}$ to OTA1 in non-linear circuit 30A (or to OTA2 in non-linear circuit 30B) and to the gate of MP2. The voltage $V_{test}$ corresponds to the desired or prescribed value of the differential voltage between $V_{DD}$ and $V_{DDC}$ (e.g., the differential voltage for which non-linear circuit 30A is being calibrated). Note that, in some embodiments $V_{test}$ may be the same during the respective calibrations of non-linear circuits 30A and 30B, whereas in other embodiments, $V_{test}$ may be different during the respective calibrations of non-linear circuits 30A and 30B. Because switch SW3A is open at this point, the current flowing through MP2 (a particular or selected MOSFET in MP2) flows through MP4 and current source IDAC. Current source IDAC is a variable or adjustable current source whose output current can be set, for example, in response to a trim signal (not shown). In some embodiments, current source IDAC receives digital trim signals from a controller (not shown, e.g., controller 35 or controller 20), and converts the digital trim signals to an analog signal used to set or adjust or control the output current of current source IDAC.

The currents flowing through MP2 and thus MP4 and the set current flowing through IDAC compete to set the voltage at the drain of MP4, i.e., node 305. Depending on the respective current levels, the voltage at the drain of MP4 appears as either a digital low or digital high signal at the input of comparator CMP1. In response, CMP1 generates an output voltage, $V_{o\_cmp\_h}$, which indicates whether the current flowing through MP2 is too low or too high in relation to the desired level of $V_{DDC}$ (or put differently, the desired voltage differential between $V_{DD}$ and $V_{DDC}$). At the point where the output voltage of comparator CMP1 switches, the current through MP4 and the current through IDAC are equal or nearly equal, which indicates that the MOSFET turned on in MP2 would generate the desired voltage differential between $V_{DD}$ and $V_{DDC}$ at the prescribed current level.

As noted above, OTA1 and MP4 form a feedback loop, which causes the voltages at the non-inverting and inverting inputs of OTA1 to be equal or nearly equal. The voltage between the non-inverting and inverting inputs of OTA1, however, is the voltage between the gate and drain of MP2. Hence, the negative feedback loop causes $V_d$=$V_g$, or $V_d$≈$V_g$, where $V_d$ and $V_g$ constitute the drain and gate voltages of MP2, respectively. Put another way, the negative feedback loop results in a virtual diode-connected MP2 (i.e., the gate and drain of the selected MOSFET in MP2 have the same or nearly same voltages).

Other components in non-linear circuit 30A operate as follows. Switches SW1A, SW4A, and SW5A are closed during calibration. The switches may be controlled by an enable signal, Enable, which is asserted during calibration. Signal Enable also enables OTA1. Switch SW6A resets calibration by dumping any charge to $V_{SS}$ to reduce the amount of time for the circuit to reset to an initial condition before another MOSFET in MP2 may be examined to determine whether using it would produce the desired voltage differential between $V_{DD}$ and $V_{DDC}$. Current source I1 is a switched or variable current source, which may be optionally used to accommodate a larger range of the differential voltage between $V_{DD}$ and $V_{DDC}$. More specifically, the variations in characteristics (e.g., W/L) of the MOSFETs in MP2 may not be evenly distributed, which can result in a gap in corresponding values of the differential voltage between $V_{DD}$ and $V_{DDC}$. Using current source I1, a current may be caused to flow from $V_{dd}$ to node 310, which can cover the gap or provide smaller steps in the differential voltage between $V_{DD}$ and $V_{DDC}$.

Figure 8:
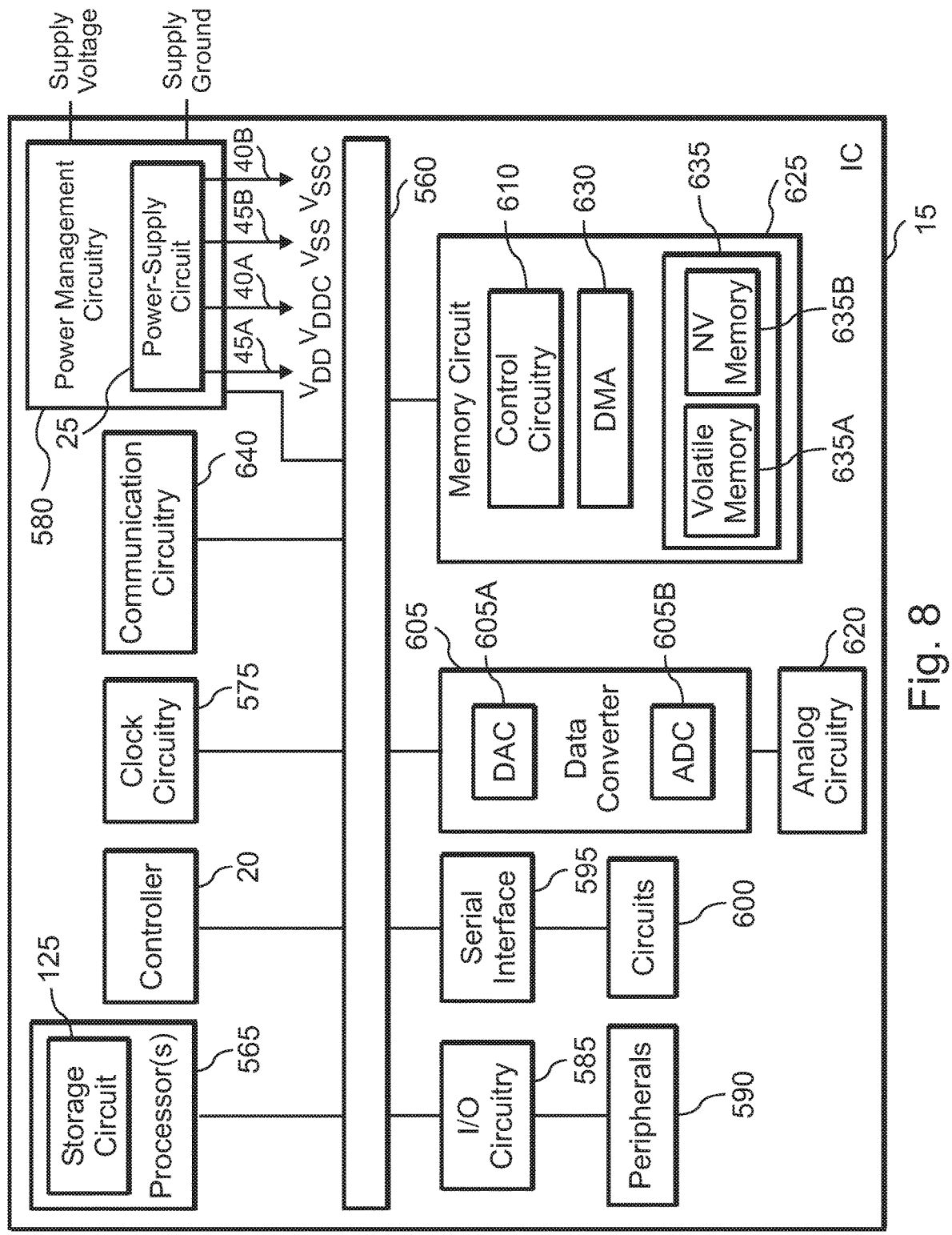
FIG. 8 shows a block diagram of a microcontroller unit (MCU) according to an exemplary embodiment.

In some embodiments, apparatus 15 may constitute an MCU. FIG. 8 shows a block diagram of such an MCU 15 according to an exemplary embodiment. MCU 15 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

MCU 15 may include link 560 coupled to one or more processors 565, clock circuitry 575, and power management circuitry 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more digital signal processors (DSPs). The DSPs may provide a variety of signal processing functions, such as arithmetic functions, filtering, delay blocks, and the like, as desired.

Clock circuitry 575 may generate one or more clock signals that facilitate or control the timing of operations of one or more blocks in MCU 15. Clock circuitry 575 may also control the timing of operations that use link 560. In some embodiments, clock circuitry 575 may provide one or more clock signals via link 560 to other blocks in MCU 15.

In some embodiments, power management circuitry 580 may reduce an apparatus's (e.g., MCU 15) clock speed, turn off the clock, reduce power, turn off power, or any combination of the foregoing with respect to part of a circuit or all components of a circuit. Further, power management circuitry 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state). Power management 580 includes power-supply circuit 25.

As described above, power-supply circuit produces uncompressed (or normal) and compressed supply and ground voltages, i.e., $V_{DD}$ and $V_{SS}$, $V_{DDC}$, and $V_{SSC}$, respectively. The uncompressed and compressed supply and ground voltages may be used to provide power to one or more circuits during the normal and low-power modes of operation, as described above in detail. Examples of such circuits include storage circuit 120, which may reside in any of the blocks shown in FIG. 8. Of course, the uncompressed and compressed supply and ground voltages may be used to provide power to other circuitry in any of the blocks in MCU 15, or to parts of such circuitry, as desired.

Link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to MCU 15. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to MCU 15, as described above.

Link 560 may couple to analog circuitry 620 via data converter 605. Data converter 405 may include one or more ADCs 605B and/or one or more DACs 605A. The ADC(s) 615 receive analog signal(s) from analog circuitry 620, and convert the analog signal(s) to a digital format, which they communicate to one or more blocks coupled to link 560.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to MCU 15 to form more complex systems, sub-systems, control blocks, and information processing blocks, as desired.

Controller 20 couples to link 560. Thus, controller 20 may communicate with and/or control the operation of various blocks coupled to link 560, for example, power management circuitry 280, including power-supply circuit 25, as desired. In addition, controller 20 may facilitate communication or cooperation between various blocks coupled to link 560.

In some embodiments, controller 20 may initiate or respond to a reset operation. The reset operation may cause a reset of one or more blocks coupled to link 560, of MCU 15, etc., as person of ordinary skill in the art will understand. For example, control circuitry 570 may cause power-supply circuit 25 to reset to an initial state (e.g., normal or low-power mode of operation, as desired).

In exemplary embodiments, controller 20 may include a variety of types and blocks of circuitry. In some embodiments, control circuitry 570 may include logic circuitry, finite-state machines (FSMs), or other circuitry to perform a variety of operations, such as the operations described above.

Communication circuitry 640 couples to link 560 and also to circuitry or blocks (not shown) external to MCU 15. Through communication circuitry 640, various blocks coupled to link 560 (or MCU 15, generally) can communicate with the external circuitry or blocks (not shown) via one or more communication protocols. Examples include universal serial bus (USB), Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. In the embodiment shown, memory circuit 625 includes control circuitry 610, memory array 635, and direct memory access (DMA) 630.

Control circuitry 610 controls or supervises various operations of memory circuit 625. For example, control circuitry 610 may provide a mechanism to perform memory read or write operations via link 360. In exemplary embodiments, control circuitry 610 may support various protocols, such as double data rate (DDR), DDR2, DDR3, and the like, as desired.

In some embodiments, the memory read and/or write operations involve the use of one or more blocks in MCU 15, such as processor(s) 565. DMA 630 allows increased performance of memory operations in some situations. More specifically, DMA 630 provides a mechanism for performing memory read and write operations directly between the source or destination of the data and memory circuit 625, rather than through blocks such as processor(s) 565.

Memory array 635 may include a variety of memory circuits or blocks. In the embodiment shown, memory array 635 includes volatile memory 635A and non-volatile (NV) memory 635B. In some embodiments, memory array 635 may include volatile memory 635A. Power-supply circuit 25 may be used to retain the state of part or all of volatile memory 635A during the low-power mode of operation, as desired. Generally, some or all of the circuitry in volatile memory 635A (e.g., control circuitry, memory cells, etc.) may be powered by uncompressed and/or compressed supply and/or ground voltages provided by power-supply circuit 25, as described above. In some embodiments, memory array 635 may include NV memory 635B. NV memory 635B may be used for storing information related to performance or configuration of one or more blocks in MCU 15. For example, NV memory 635B may store configuration and/or calibration information or values for power-supply circuit 25, as described above.

Although the above description relates to MCUs, as persons of ordinary skill in the art will understand, one may apply the disclosed concepts effectively to various type of electronic circuitry or IC, as desired by making appropriate modifications. Examples of such circuitry or ICs include mixed-signal ICs, processors, CPUs, microprocessors, memory controllers, I/O controllers, signal processors, DSPs, and the like.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only. Where applicable, the figures might or might not be drawn to scale, as persons of ordinary skill in the art will understand.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An apparatus comprising:
   a first storage circuit to store information, the first storage circuit having a normal mode of operation, and a low-power mode of operation in which the first storage circuit consumes less power than in the normal mode of operation;
   a second storage circuit to retain a state of the first storage circuit in the low-power mode of operation, the retained state to be provided to the first storage circuit when the first storage circuit resumes the normal mode of operation; and
   a power-supply circuit to provide a normal supply voltage to the first storage circuit in the normal mode of operation, the power-supply circuit comprising a first non-linear circuit to provide a compressed supply voltage to the second storage circuit in the low-power mode of operation, wherein the normal supply voltage is greater than the compressed supply voltage.

2. The apparatus according to claim 1, wherein the power-supply circuit further provides a normal ground voltage to the first storage circuit in the normal mode of operation, the power-supply circuit further comprising a second non-linear circuit to provide a compressed ground voltage to the second storage circuit in the low-power mode of operation, wherein the normal ground voltage is less than the compressed ground voltage.

3. The apparatus according to claim 1, wherein the first storage circuit comprises a flip-flop, and the second storage circuit comprises a latch.

4. The apparatus according to claim 2, wherein the first non-linear circuit comprises a first transistor; and wherein the second non-linear circuit comprises a second transistor.

5. The apparatus according to claim 4, wherein the first transistor comprises a transistor selected from a first plurality of transistors having respective width-to-length ratios; and wherein the second transistor comprises a transistor from a second plurality of transistors having respective width-to-length ratios strengths.

6. The apparatus according to claim 4, wherein the calibrator comprises a feedback loop comprising a transconductance stage coupled to the first transistor and to the second transistor.

7. The apparatus according to claim 4, wherein the first transistor comprises a first compound transistor, including a first plurality of metal oxide semiconductor field effect transistors (MOSFETs).

8. The apparatus according to claim 7, wherein the second transistor comprises a second compound transistor, including a second plurality of MOSFETs.

9. The apparatus according to claim 2, further comprising a calibrator to calibrate a first voltage differential between the normal supply voltage and the compressed supply voltage.

10. The apparatus according to claim 9, wherein the calibrator further calibrates a second voltage differential between the normal ground voltage and the compressed ground voltage.

11. A method comprising:
    storing information by using a first storage circuit, the first storage circuit having a normal mode of operation, and a low-power mode of operation in which the first storage circuit consumes less power than in the normal mode of operation;

retaining, by using a second storage circuit, a state of the first storage circuit in the low-power mode of operation, the retained state to be provided to the first storage circuit when the first storage circuit resumes the normal mode of operation; and supplying, by using a power-supply circuit, a normal supply voltage to the first storage circuit in the normal mode of operation, the power-supply circuit using a first non-linear circuit to provide a compressed supply voltage to the second storage circuit in the low-power mode of operation, wherein the normal supply voltage is greater than the compressed supply voltage.

12. The method according to claim 11, further comprising providing, by using a second non-linear circuit in the power-supply circuit to provide a normal ground voltage to the first storage circuit in the normal mode of operation, and a compressed ground voltage to the second storage circuit in the low-power mode of operation, wherein the normal ground voltage is less than the compressed ground voltage.

13. The method according to claim 12, wherein using the first non-linear circuit comprises using a first transistor, and wherein using the second non-linear circuit comprises using a second transistor.

14. The method according to claim 13, wherein using the first transistor comprises using a transistor selected from a first plurality of transistors having respective width-to-length ratios, and wherein using the second transistor comprises using a transistor from a second plurality of transistors having respective width-to-length ratios strengths.

15. The method according to claim 13, further comprising calibrating a first voltage differential between the normal supply voltage and the compressed supply voltage.

16. The method according to claim 15, wherein calibrating the first voltage differential between the normal supply voltage and the compressed supply voltage comprises using a feedback loop coupled to the first transistor.

17. The method according to claim 13, further comprising calibrating a second voltage differential between the normal ground voltage and the compressed ground voltage.

18. The method according to claim 17, wherein calibrating the second voltage differential between the normal ground voltage and the compressed ground voltage comprises using a feedback loop coupled to the second transistor.

19. The method according to claim 11, wherein storing information by using the first storage circuit comprises using a flip-flop, and wherein retaining, by using the second storage circuit, comprises using a latch.

20. The method according to claim 11, wherein using the first transistor comprises using a first compound transistor, and wherein using the second transistor comprises using a second compound transistor.

* * * * *